United States Patent
Tanaka et al.

(10) Patent No.: US 9,352,693 B2
(45) Date of Patent: May 31, 2016

(54) REAR STRUCTURE OF VEHICLE

(71) Applicant: MAZDA MOTOR CORPORATION, Hiroshima (JP)

(72) Inventors: Kazuhiro Tanaka, Kure (JP); Tsuneki Shimanaka, Aki-gun (JP); Chie Okawa, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/626,312

(22) Filed: Feb. 19, 2015

(65) Prior Publication Data
US 2015/0239400 A1 Aug. 27, 2015

(30) Foreign Application Priority Data

Feb. 27, 2014 (JP) ................. 2014-037546

(51) Int. Cl.
*B60J 7/00* (2006.01)
*B60R 5/04* (2006.01)
*B62D 25/12* (2006.01)
*B62D 25/24* (2006.01)
*B62D 25/08* (2006.01)
*B60J 5/10* (2006.01)
*B60R 19/24* (2006.01)

(52) U.S. Cl.
CPC . *B60R 5/04* (2013.01); *B60J 5/107* (2013.01); *B60R 19/24* (2013.01); *B62D 25/087* (2013.01); *B62D 25/12* (2013.01); *B62D 25/24* (2013.01)

(58) Field of Classification Search
CPC .................. A47B 96/021; B65D 2543/00629; B65D 2543/00685; B65D 2543/00796; B65H 2701/31; H01L 2924/00; H01L 2924/00014; H01L 2224/45144; H01L 2924/00015; H01L 2224/48463
USPC ........................................... 296/193.09
See application file for complete search history.

(56) References Cited

U.S. PATENT DOCUMENTS 4,950,025 A * 8/1990 Yoshii .................. B62D 25/087
296/203.04
5,018,780 A * 5/1991 Yoshii ...................... B60J 7/108
296/181.4

(Continued)

FOREIGN PATENT DOCUMENTS

JP H06-32216 U 4/1994

*Primary Examiner* — Kiran B Patel
(74) *Attorney, Agent, or Firm* — Studebaker & Brackett PC

(57) ABSTRACT

A trunk panel comprises a bottom portion, a first standing wall portion, and a second standing wall portion. A protrusion portion is provided at a rear end portion of the bottom portion and the second standing wall portion to protrude upward. This protrusion portion is spaced apart from the first standing wall portion such that a passage is formed between the protrusion portion and the first standing wall portion, wherein the passage is configured to allow water to flow down from a portion of the bottom portion which is located forward of the protrusion portion toward a rear end portion of the bottom portion and the second standing wall portion. Thereby, any bad influences of rainwater or the like, which may be brought to various kinds of members around or arranged below a rear lamp, can be properly restrained.

8 Claims, 10 Drawing Sheets

(56) References Cited

U.S. PATENT DOCUMENTS

| | | | | |
|---|---|---|---|---|
| 5,110,177 A * | 5/1992 | Akio | ................... | B62D 21/11 280/784 |
| 5,580,121 A * | 12/1996 | Dange | ................. | B62D 25/088 296/181.4 |
| 6,443,518 B1 * | 9/2002 | Rohl | ................... | B62D 25/082 296/187.12 |
| 7,083,225 B2 * | 8/2006 | Yakata | ................ | B62D 25/088 296/187.11 |
| 7,281,756 B2 * | 10/2007 | Fukushi | .............. | B62D 25/084 296/203.04 |
| 7,347,475 B2 * | 3/2008 | Ikemoto | .............. | B62D 25/087 296/193.08 |
| 7,513,329 B2 * | 4/2009 | Nakashima | ........... | B60G 7/006 180/312 |
| 7,628,446 B2 * | 12/2009 | Harney | ................ | B62D 25/087 296/193.02 |
| 7,758,108 B2 * | 7/2010 | Egawa | ................ | B62D 25/087 296/203.04 |
| 9,168,957 B2 * | 10/2015 | Yano | ................... | B62D 25/087 |
| 2004/0066061 A1 * | 4/2004 | Engels | ................... | B60R 19/18 296/193.08 |
| 2006/0119140 A1 * | 6/2006 | Yamazaki | ............. | B62D 25/08 296/203.04 |
| 2007/0158977 A1 * | 7/2007 | Yasukouchi | ....... | B62D 25/2027 296/203.04 |
| 2008/0169682 A1 * | 7/2008 | Hedderly | ............. | B62D 25/08 296/193.08 |
| 2008/0277968 A1 * | 11/2008 | Egawa | ................ | B62D 25/087 296/193.08 |
| 2013/0001986 A1 * | 1/2013 | Takenaka | ............ | B62D 25/087 296/193.08 |
| 2013/0169005 A1 * | 7/2013 | Okamachi | ............ | B62D 25/08 296/193.08 |
| 2013/0241240 A1 * | 9/2013 | Tokumoto | ............. | B62D 25/08 296/193.08 |
| 2014/0054928 A1 * | 2/2014 | Narahara | ........... | B62D 25/2027 296/193.08 |
| 2015/0183467 A1 * | 7/2015 | Ebihara | ................. | B62D 25/08 296/187.11 |
| 2015/0284033 A1 * | 10/2015 | Yamamoto | ............. | B62D 25/16 296/193.05 |

\* cited by examiner

REAR STRUCTURE OF VEHICLE

BACKGROUND OF THE INVENTION

The present invention relates to a rear structure of a vehicle in which a trunk room provided to open upward and be closed with a trunk lid is formed at a rear portion of the vehicle.

Japanese Utility-Model Laid-Open Publication No. H6-32216 discloses a general water-drain structure provided around a trunk room. According to this structure, part of rainwater or the like which come into a space between a weather strip 8A and a trunk-opening-portion flange 4A is controlled so as to flow along beads 14, 15, but the most part of water flows down behind a rear combination lamp, without being controlled, as shown by an arrow in FIG. 9 of this publication. This rainwater or the like flowing down without being controlled may provide environments in which some mud accumulates behind a tail lamp or a vehicle body rusts when the vehicle is used for a long term. In these days, a radar device or an aluminum-made rear bumper reinforcement are arranged below the tail lamp, so it has been required to control the rainwater or the like properly in order to prevent that such devices or components have the above-described bad mud accumulation or rusting.

SUMMARY OF THE INVENTION

The present invention has been devised in view of the above-described matters, and an object of the present invention is to provide a rear structure of a vehicle which can properly restrain bad influences of the rainwater or the like brought to the rear lamp itself or various devices or components arranged below the rear lamp.

According to the present invention, there is provided a rear structure of a vehicle, in which a trunk room provided to open upward and be closed with a trunk lid is formed at a rear portion of the vehicle, comprising a pair of trunk panels extending longitudinally provided on both outward sides, in a vehicle width direction, of an opening portion of the trunk room, wherein the trunk panel comprises a bottom portion which is provided to face a lower face of the trunk lid in a close state in which the trunk lid closes the trunk room, a first standing wall portion which is provided to stand upward from the bottom portion and extend along an opening edge of the opening portion of the trunk room, a second standing wall portion which is provided to stand upward from an outward edge of the bottom portion and extend longitudinally, and a protrusion portion which is provided at a rear end portion of the bottom portion and the second standing wall portion to protrude upward and below which at least part of a rear combination lamp is stored, and the protrusion portion is spaced apart from the first standing wall portion such that a passage is formed between the protrusion portion and the first standing wall portion, the passage being configured to allow water to flow down from a portion of the bottom portion which is positioned forward of the protrusion portion toward a rear end portion of the bottom portion.

According to the present invention, the water of rainwater or the like coming into a space between the trunk lid and the trunk panel is gathered at the bottom portion between the first and second standing wall portions of the trunk panel. Herein, since the protrusion portion provided at the rear end portion of the bottom portion and the second standing wall portion and protruding upward is formed and this protrusion portion is spaced apart from the first standing wall portion, the above-described water can be drained outside of the trunk panel through a portion interposed between the protrusion portion and the first standing wall portion, i.e., through a portion located on an inward side, in the vehicle width direction, of the protrusion portion. Accordingly, the water of rainwater or the like can be restrained from flowing into the space where the rear combination lamp is stored below the protrusion portion. Consequently, any bad influences of the rainwater or the like brought to the lamp itself or various devices or components arranged below the lamp can be properly restrained.

In an embodiment of the present invention, the trunk panel further comprises a guide wall portion which extends from a rear end of the first standing wall portion toward a rear edge of the bottom portion and forms a groove connecting to the passage between the guide wall portion and the protrusion portion.

According to the above-described embodiment, the water flowing down between the protrusion portion and the first standing wall portion can be guided to the rear edge of the bottom portion through the groove formed between the guide wall portion and the protrusion portion. Thus, the rainwater or the like coming into the space between the trunk lid and the trunk panel can be surely drained outside of the trunk lid.

In another embodiment of the present invention, the above-described protrusion portion is configured such that an outer peripheral edge thereof extends rearward, gradually protruding inward in a vehicle width direction in a plan view.

According to the above-described embodiment, the rainwater or the like located in front of the protrusion portion can be smoothly guided toward an inward side, in the vehicle width direction, of the protrusion portion, so that the rainwater or the like can be drained outside of the trunk lid more surely.

Herein, it may be preferable that a radar device be arranged right below the rear combination lamp and a rear end portion of the outer peripheral edge of the protrusion portion be located on an inward side, in the vehicle width direction, of the radar device in a plan view.

Further, it may be preferable that a hole for attaching the rear combination lamp be provided at an upper portion of the protrusion portion.

Other features, aspects, and advantages of the present invention will become apparent from the following description which refers to the accompanying drawings.

DETAILED DESCRIPTION OF THE INVENTION

Hereinafter, an embodiment of the present invention will be described referring to the accompanying drawings.

Figure 1:
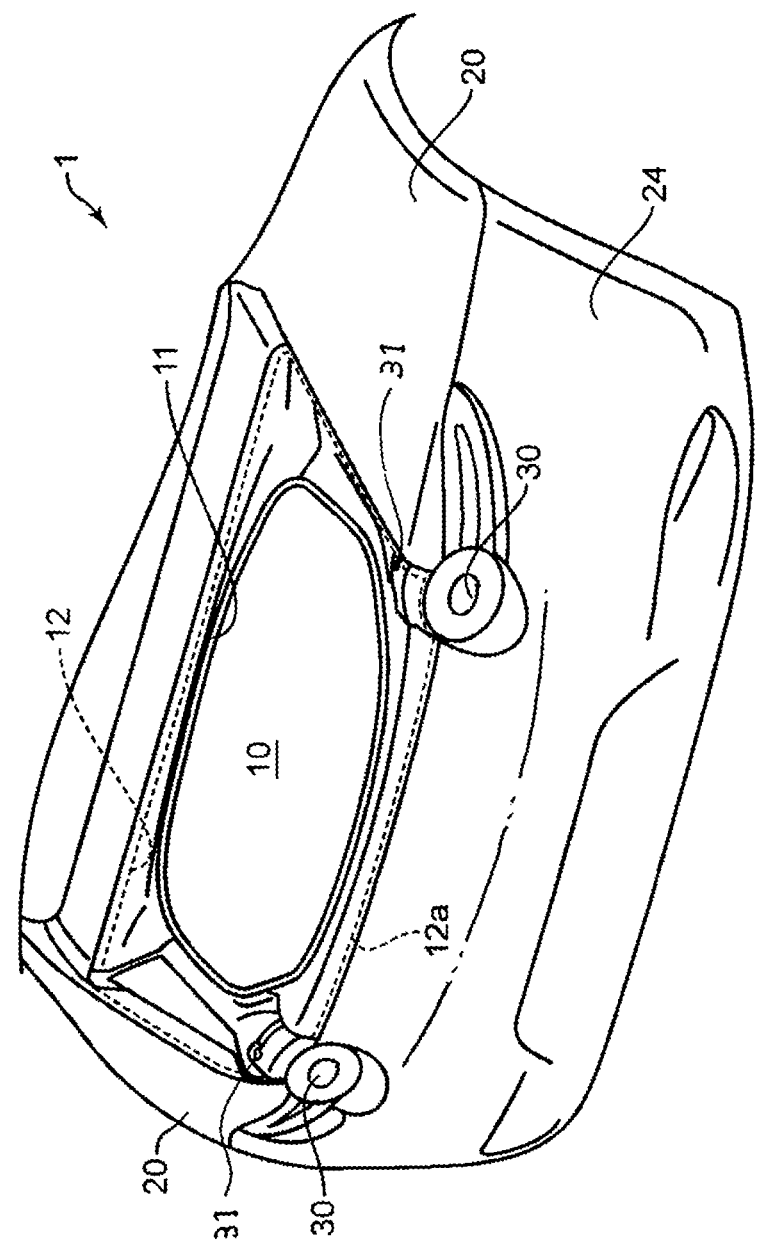
FIG. 1 is a schematic view showing a rear portion of a vehicle 1 to which a rear structure of a vehicle of the present experiment is applied.

FIG. 1 is a schematic view showing a rear portion of a vehicle 1 to which a rear structure of a vehicle of the present experiment is applied.

The vehicle 1 has a trunk room 10 at its rear portion, which opens upward only. The trunk room 10 is formed between a pair of outer panels 20, 20 which extend longitudinally on both ends in a vehicle width direction. The trunk room 10 can be closed with a trunk lid 12 shown by a broken line in FIG. 1. An outer surface of the trunk lid 12 extends rearward and then downward in a state in which the trunk lid 12 closes the trunk room 10.

The vehicle 1 is equipped with a pair of rear combination lamps (rear lamps) 30, 30, which extend from below the outer panels 20, 20 to respective positions which are located on an inward side, in the vehicle width direction, of the outer panels 20, 20, i.e., to respective positions which are located on the inward side, in the vehicle width direction, relative to both-side outward edges, in the vehicle width direction, of the trunk lid 12 positioned in its close state. Further, respective inward portions, in the vehicle width direction, of the rear combination lamps 30, 30 project upward beyond a lower edge 12a of an upper surface of the trunk lid 12 positioned in its close state.

Figure 2:
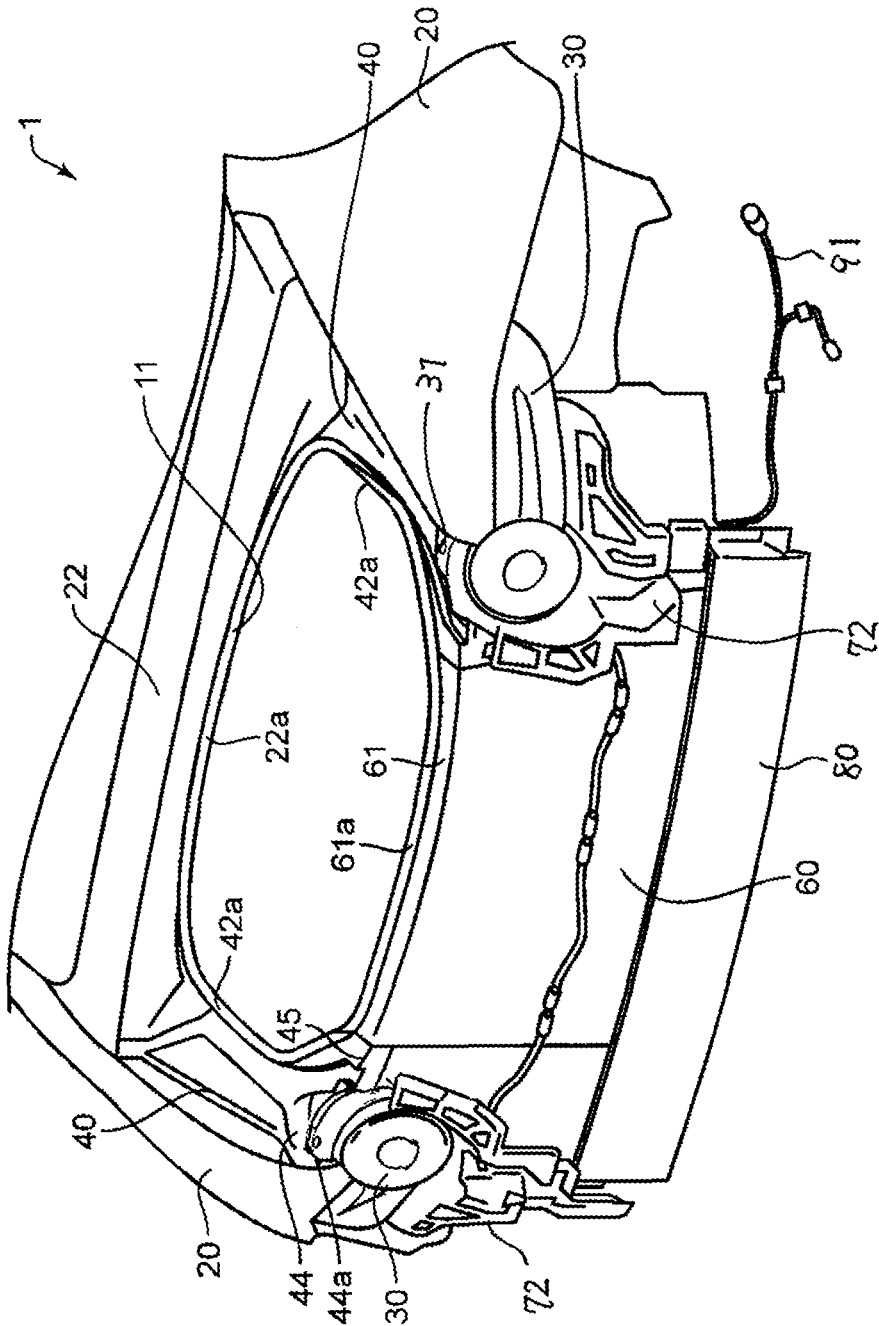
FIG. 2 is a schematic view of the rear portion shown in FIG. 1, which shows a state in which a rear bumper facia is removed from a state shown in FIG. 1.

FIG. 2 is a schematic view of the rear portion shown in FIG. 1, which shows a state in which a rear bumper facia 24 is removed from a state shown in FIG. 1.

As shown in FIG. 2 and others, a pair of trunk panels 40, 40 which extend longitudinally are provided on both outward sides, in the vehicle width direction, of an opening portion 11 of the trunk room 10. The trunk panels 40, 40 extend from a front end of the opening portion 11 of the trunk room 10 to a vehicle-body rear end.

In the present embodiment, a rear end portion of the opening portion 11 becomes narrower in the vehicle width direction. That is, the width of the opening portion 11 becomes smaller toward the vehicle rear. Corresponding to the shape of the opening portion 11, the trunk panels 40, 40 are configured such that their respective rear end portions extend obliquely inward in the vehicle width direction along the opening portion of the trunk room. Specifically, the rear end portions of the trunk panels 40, 40 extend rearward, projecting inward, so that rear end portions of their inward ends slant rearward and inward.

A rear deck member 22 extends in the vehicle width direction at a position in front of the opening portion 11 of the trunk room 10. The rear deck member 22 extends between front ends of the trunk panels 40, 40.

An upper end portion of an end panel 60 extends in the vehicle width direction at a position located in back of the opening portion 11 of the trunk room 10. Specifically, an upper end portion 61 of the end panel 60 is bent forward, and this bent upper end portion 61 is arranged at a rear portion of the opening portion 11 of the trunk room 10. The upper end portion 61 of the end panel 60 extends in the vehicle width direction between the rear ends of the trunk panels 40, 40. Herein, the end panel 60 and the inward end portion, in the vehicle width direction, of the rear end portion of the trunk panel 40 are covered with the bumper facia 24. Herein, a resin-made retainer 72 for maintaining the shape of the bumper facia 24 is attached to the end panel 60.

As described above, the rear deck member 22, the trunk panels 40, 40, and the upper end portion 61 of the end panel 60 enclose the opening portion 11 of the trunk room 10 in the present embodiment. These respective panels have flanges 22a, 42a, 42a, 61a which project upward along an opening edge of the opening portion 11 of the trunk room 10. A weather strip, not illustrated, is attached to the flanges 22a, 42a, 42a, 61a, so that the rainwater or the like can be restrained from flowing into the opening portion 11.

Figure 3:
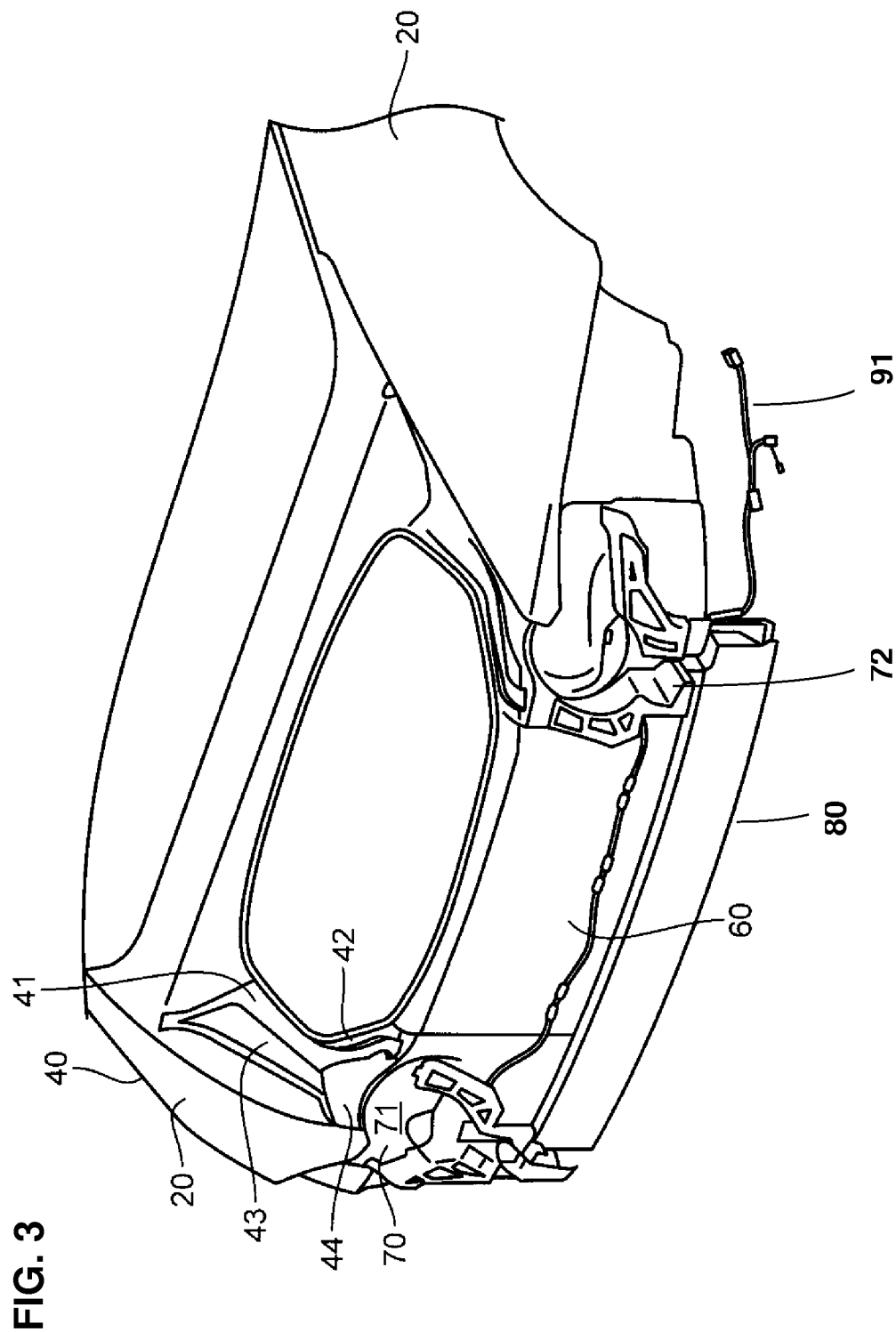
FIG. 3 is a schematic view of the rear portion shown in FIG. 2, which shows a state in which rear combination lamps are removed from the state shown in FIG. 2.
Figure 4:
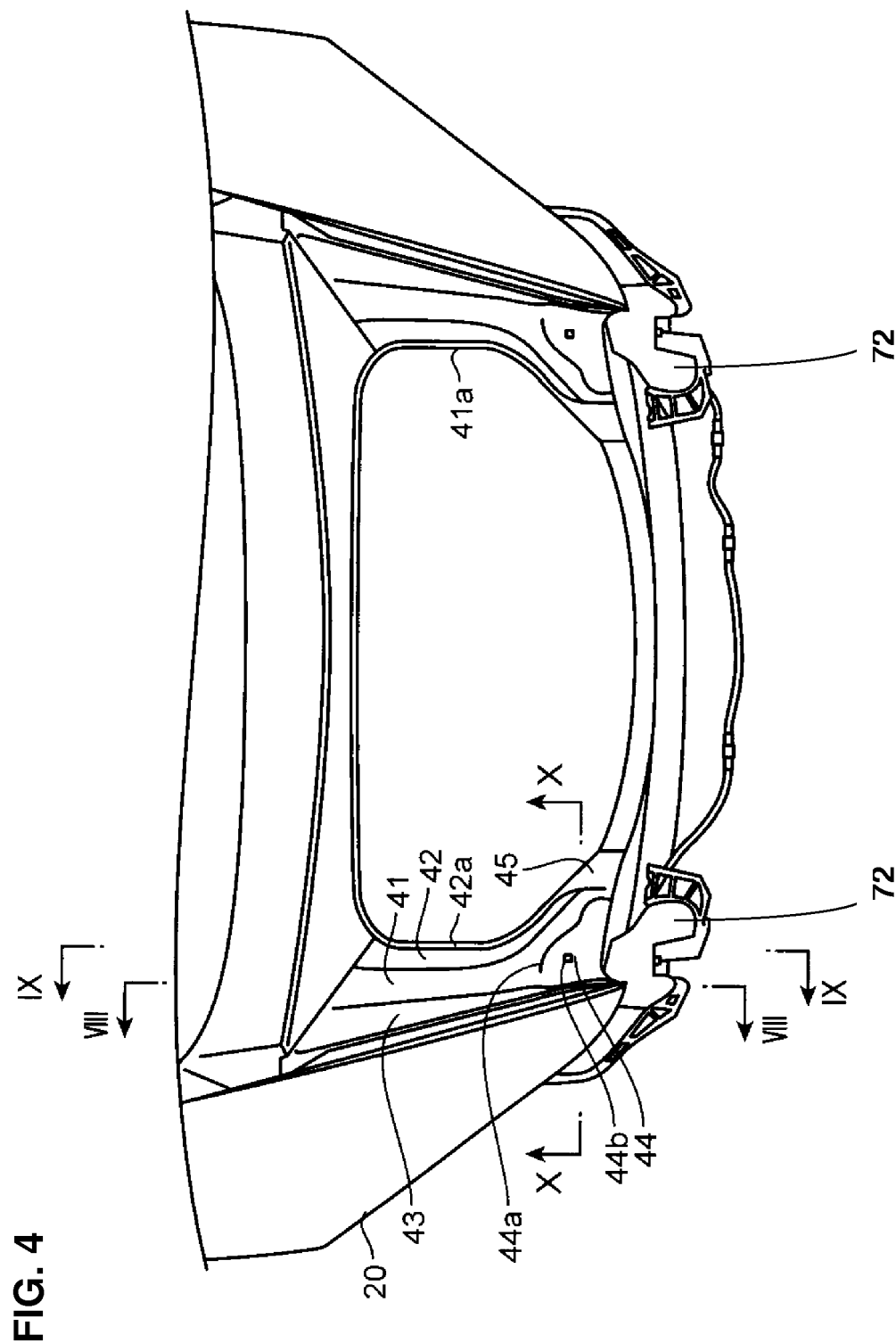
FIG. 4 is a schematic plan view, which corresponds to FIG. 3.
Figure 5:
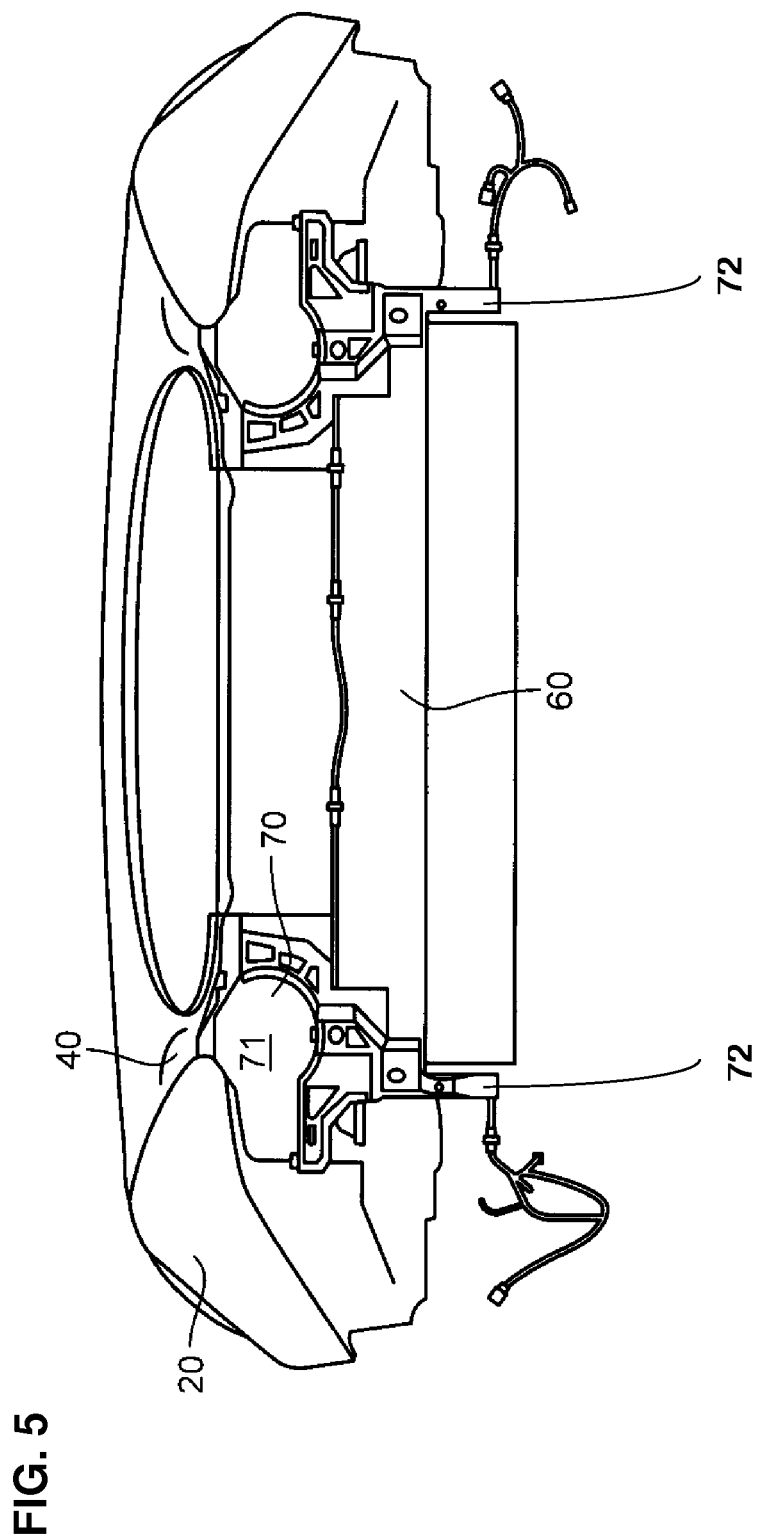
FIG. 5 is a schematic back view, which corresponds to FIG. 4.
Figure 6:
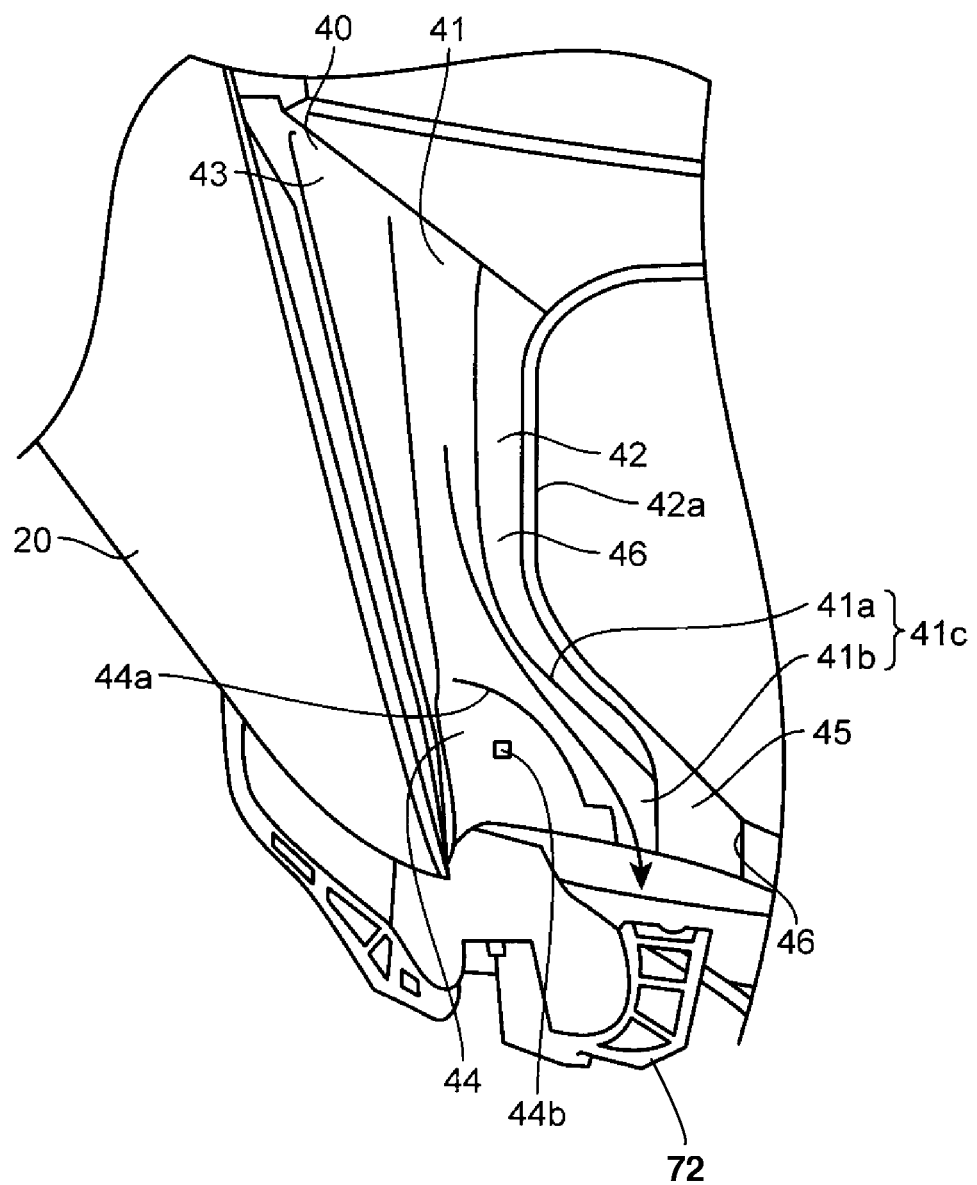
FIG. 6 is an enlarged view of part of FIG. 4.
Figure 7:
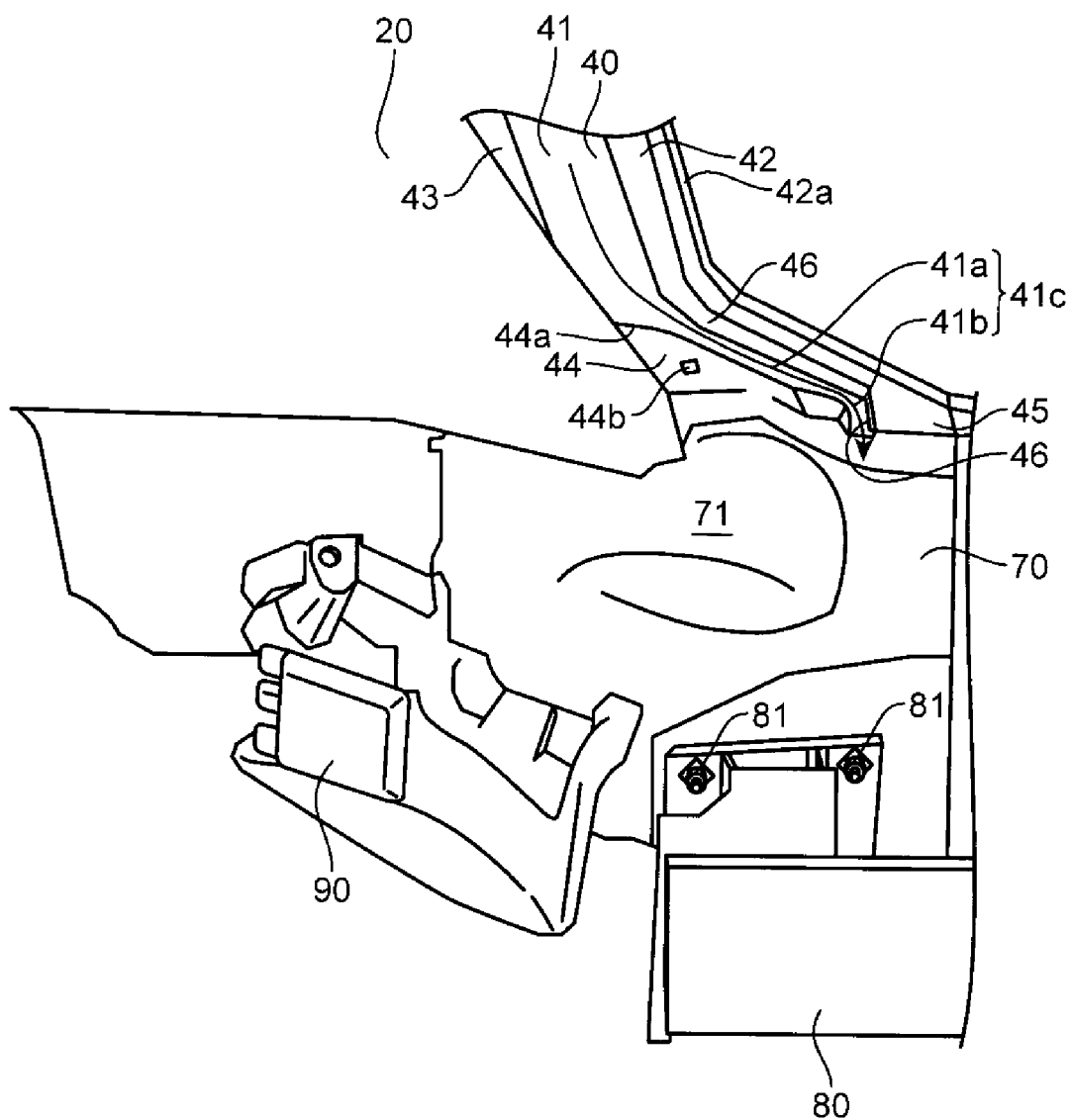
FIG. 7 is an enlarged view of a portion around a rear end portion of a trunk panel.
Figure 8:
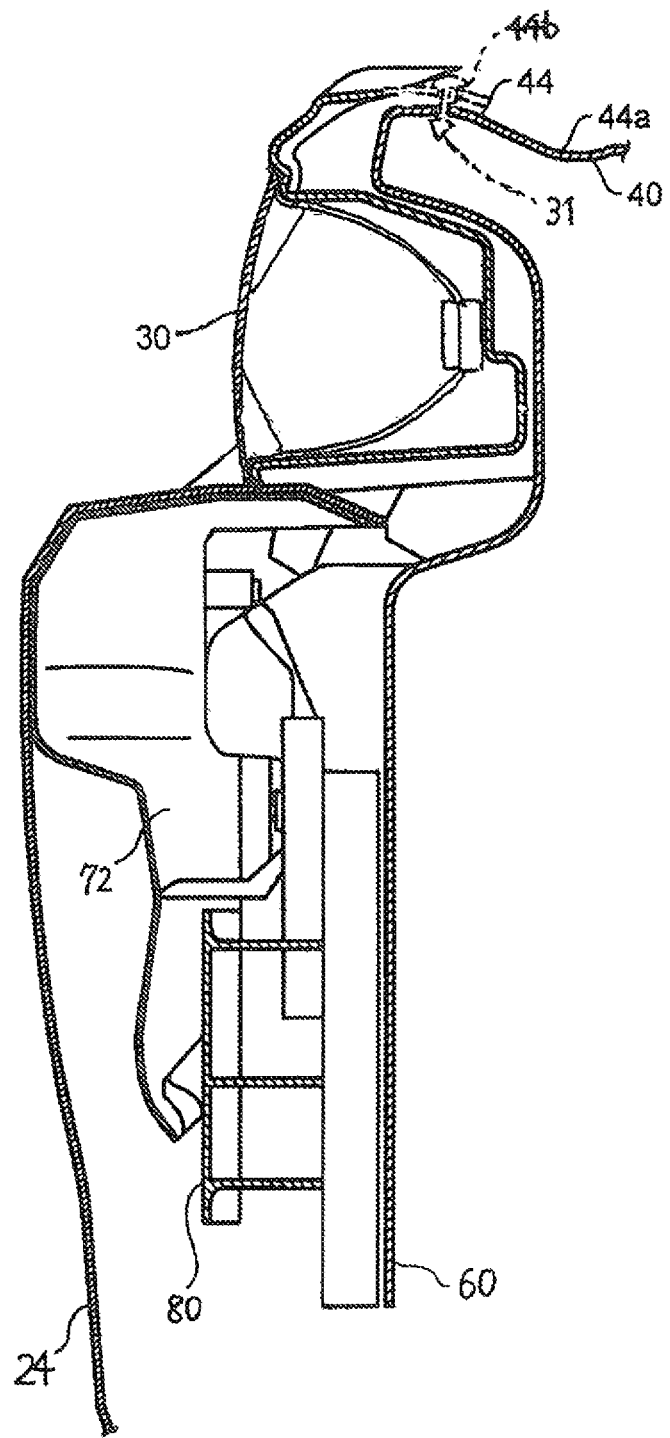
FIG. 8 is a sectional view taken along line VIII-VIII of FIG. 4.
Figure 9:
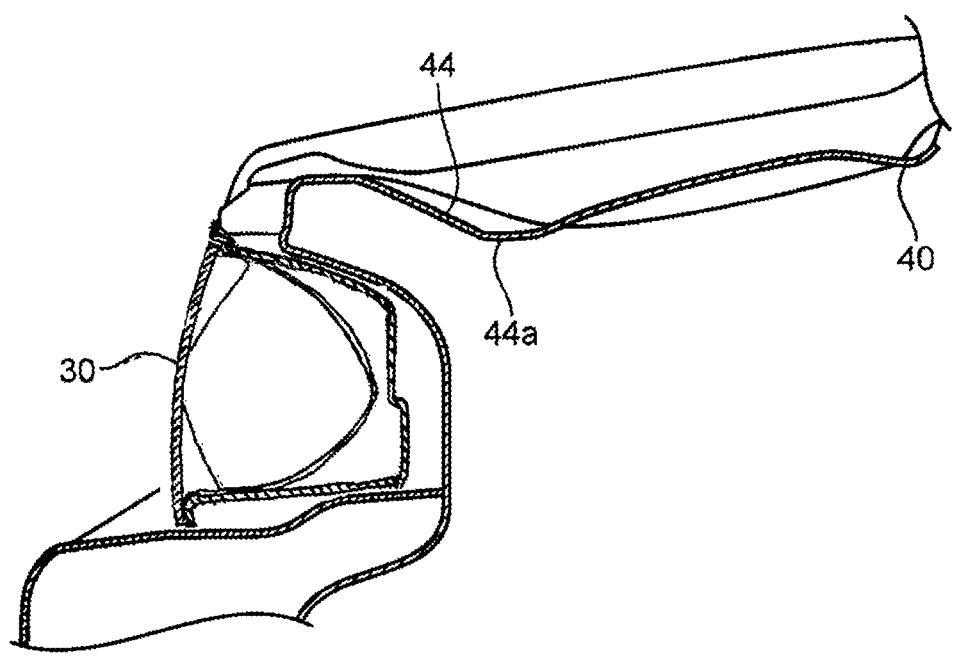
FIG. 9 is a sectional view taken along line IX-IX of FIG. 4.
Figure 10:
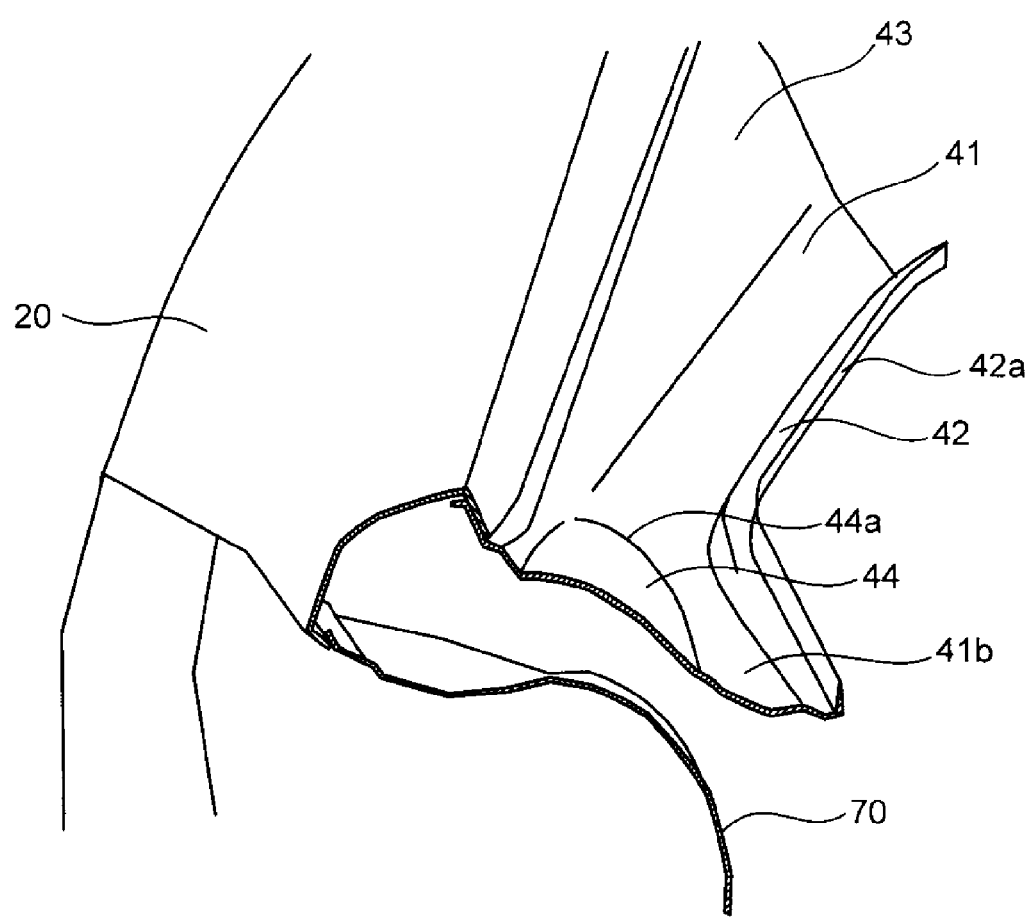
FIG. 10 is a sectional view taken along line X-X of FIG. 4.

Next, the details of the trunk panel 40 will be described. In the present embodiment, the trunk panel 40 is made of a sheet of panel. FIG. 3 is a schematic view of the rear portion shown in FIG. 2, which shows a state in which the rear combination lamps 30 are removed from the state shown in FIG. 2. FIG. 4 is a schematic plan view, which corresponds to FIG. 3. FIG. 5 is a schematic back view, which corresponds to FIG. 4. FIG. 6 is an enlarged view of part of FIG. 4. FIG. 7 is an enlarged view of the portion around the rear end portion of the trunk panel 40. FIG. 8 is a sectional view taken along line VIII-VIII of FIG. 4. FIG. 9 is a sectional view taken along line IX-IX of FIG. 4. FIG. 10 is a sectional view taken along line X-X of FIG. 4.

The trunk panel 40 comprises a bottom portion 41 which is provided to face a lower face of the trunk lid 12 in a close state in which the trunk lid 12 closes the trunk room 10, a first standing wall portion 42 which is provided to stand upward from the bottom portion 41 and extend along the opening edge of the opening portion 11 of the trunk room 10, and a second standing wall portion 43 which is provided to stand upward from an outward edge of the bottom portion 41 and extend longitudinally.

The second standing wall portion 43 slants downward and inward, in the vehicle width direction, from an inward edge, in the vehicle width direction, of the outer panel 20 as shown in FIGS. 3 and 7.

The first standing wall portion 42 slants upward and inward and then extends inward in the vehicle width direction substantially horizontally as shown in FIG. 7 and others. The above-described flange 42a is provided at the inward edge, in the vehicle width direction, of the first standing wall portion 42, and an inward edge, in the vehicle width direction, of the first standing wall portion 42a projects upward. As described above, in the present embodiment, the rear end portion of the trunk panel 40 slants rearward and inward, and a rear end portion of the first standing wall portion 42 also slants rearward and inward accordingly.

As shown in FIG. 6, the bottom portion 40 extends from an upper end to a rear end of the trunk panel 40. A protrusion portion 44 is provided at an outward end portion, in the vehicle width direction, of a rear end portion of the bottom portion 41 to protrude upward. In the present embodiment, the protrusion portion 44 is provided at an outward end portion, in the vehicle width direction, of an inward-extending portion of the trunk panel 40, and an outer peripheral edge 44a of the protrusion portion 44 faces a portion of the first standing wall portion 42 which slants obliquely inward.

An inward portion, in the vehicle width direction, of the rear combination lamp 30 is arranged below the protrusion portion 44. Specifically, as shown in FIGS. 3, 5 and others, a lamp storage panel 70 is arranged below the trunk panel 40 and the outer panel 20 and on the outward side of the end panel 60. The lamp storage panel 70 has a lamp storage portion 71 which is concaved forward and stores the rear combination lamp 30 therein. An upper face of an inward portion, in the vehicle width direction, of an inside face of the lamp storage portion 71 protrudes upward, and the protrusion portion 44 of the trunk panel is arranged along the protrusion portion of the lamp storage portion 71. As shown in FIG. 6, the protrusion portion 44 has a through hole 44b for attachment of the rear combination lamp 30 by using a grommet 31 at its upper face portion.

As shown in FIG. 6, the protrusion portion 44 is configured such that its outer peripheral edge 44a extends, protruding rearward and inward in the plan view. Further, the protrusion portion 44 is configured such that a portion thereof which is located rearward of the outer peripheral edge 44a protrudes upward more as shown in FIGS. 8, 9 and others, and that a portion thereof which is located outward of the outer peripheral edge 44*a* protrudes upward more as shown in FIG. 10.

As shown in FIG. 6, the protrusion portion 44 is spaced outward, in the vehicle width direction, apart from the first standing wall portion 42 such that a passage 41*a* is formed between the protrusion portion 44 and the first standing wall portion 42 of the trunk panel 40.

In the present embodiment, a guide wall portion 45 which projects upward and extends longitudinally is provided near a rear edge of the trunk panel 40 at a position which is located inward, in the vehicle width direction, apart from the protrusion portion 44. The guide wall portion 45 is configured to be continuous from the first standing wall portion 42 and extend from a rear end of the first standing wall portion 42 toward a rear edge of the bottom portion 41. Thus, as shown in FIG. 6 and others, a groove 41*b* which is formed by the protrusion portion 44 and the guide wall portion 45 and connects to the above-described passage 41*a* is formed near the rear edge of the trunk panel 40.

That is, a rainwater guide wall 46 is formed by the first standing wall portion 42 and the guide wall portion 45 at the inward end portion of the trunk panel 40. The rainwater guide wall 46 projects upward and extends rearward from the front end of the trunk panel 40 along the opening edge of the trunk room 10, then extends obliquely rearward and inward and extends rearward at the position located near the rear edge of the trunk panel 40. And, a rainwater guide passage 41*c* which comprises the above-described passage 41*a* and the above-described groove 41*b* is formed by the rainwater guide wall 46 and the protrusion portion 44 at the rear end portion of the trunk panel 40.

In the vehicle 1 which is configured as above, the rainwater coming in from the space between the trunk lid 12 and the outer panel 20 to the space between the trunk lid 12 and the trunk panel 40 flows down the first standing wall portion 42 and the second standing wall portion 43 onto the bottom portion 41 of the trunk panel 40.

Herein, the rainwater exiting at a portion of the bottom portion 41 which is located in front of the protrusion portion 44 moves rearward along the bottom portion 41 and flows on the rainwater guide passage 41*c*, and then is drained outside of the trunk panel 40 from the rear edge of the trunk panel 40. Specifically, as shown in an arrow shown in FIGS. 6 and 7, the water in front of the protrusion portion 44 is guided inward, in the vehicle width direction, along the outer peripheral edge 44*a* of the protrusion portion 44, flows obliquely rearward and inward through the passage 41*a* formed between the protrusion portion 44 and the first standing wall portion 42, and then is drained outside from the rear edge of the trunk panel 40 through the groove 41*b* formed between the protrusion portion 44 and the guide wall 45.

As described above, in the vehicle 1 according to the present embodiment, the water of rainwater or the like coming into the space formed between the trunk lid 12 and the outer panel 20 is guided to the portion of the bottom portion 41 of the trunk panel 40 which is located on the inward side of the protrusion portion 44 below which the rear combination lamp 30 is arranged, and then drained outside from the above-described portion. Accordingly, the rainwater or the like can be surely restrained from flowing down toward the rear combination lamp 30, so that any bad influences of the rainwater or the like brought to the members around or arranged below the rear combination lamp 30 can be properly restrained.

Herein, in the conventional structure, since the rainwater containing sand dusts flows down on a surface of a rear end panel behind a rear lamp, there is a concern that the sand dusts may accumulate behind the rear lamp, so that the rainwater held back by the accumulating sand dusts may come into the rear lamp through vent holes. In the present embodiment, however, the rainwater does not flow into the lamp storage portion 71 from the bottom portion 41 of the trunk panel 40, so that this concern is properly restrained.

Further, in the conventional structure, a hole attaching a grommet to a rear combination lamp is formed at a bottom portion of a trunk panel where the rainwater flows, so that there is a concern that the rainwater may come in through this hole. In the present embodiment, however, since the lamp-attachment hole 44*b* is formed at an upper portion (i.e., the upper face portion) of the protrusion portion 44, so that this concern is properly restrained.

Moreover, in the conventional structure, since a bolt 81 for fastening an aluminum-made bumper reinforcement 80 to the rear end panel is wet with the rainwater flowing down from the trunk panel, a rust-preventive treatment is necessarily applied to the bolt. In the present embodiment, the bolt 81 is prevented from getting wet with the rainwater, so that any costly rust-preventive treatment can be omitted.

Additionally, in the present embodiment, while a millimeter wave radar to detect a rear vehicle is arranged below the lamp storage portion, no rainwater falls on this radar or no sand dusts accumulate on this radar, so that the performance of the radar can be maintained properly for a long time. Also, it can be prevented by guidance of a retainer 72 that a harness 91 leading to a radar 90 gets wet with the rainwater.

The above-described rearward-and-downward slant configuration of the bottom portion 41 is superior in preventing the rainwater or the like from staying at the bottom portion 41 for a long period of time, thereby restraining the weather strip attached to the trunk panel 40 from deteriorating.

The present invention should not be limited to the above-described embodiment, and any other modifications or improvements may be applied within the scope of a sprit of the present invention.

For example, while the above-described embodiment describes the case in which the guide wall portion 45 is provided such that the groove 41*b* extending toward the rear edge of the trunk panel 40 is formed between the guide wall portion 45 and the protrusion portion 44, this guide wall portion 45 may be omitted. Herein, the guide wall portion 45 can drain the water on the bottom portion 41 of the trunk panel 40 outside the vehicle body from the rear edge of the trunk panel 40 more surely.

Moreover, while the above-described embodiment describes the case in which the rear end portion of the opening portion 11 of the trunk room 10 becomes narrower in the vehicle width direction and the rear end portion of the trunk panel 40 extends inward accordingly, the trunk panel 40 may be configured to extend longitudinally with substantially a constant width.

What is claimed is:

1. A rear structure of a vehicle, in which a trunk room provided to open upward and be closed with a trunk lid is formed at a rear portion of the vehicle, comprising:
    a pair of trunk panels extending longitudinally provided on both outward sides, in a vehicle width direction, of an opening portion of the trunk room,
    wherein said trunk panel comprises a bottom portion which is provided to face a lower face of the trunk lid in a close state in which the trunk lid closes the trunk room, a first standing wall portion which is provided to stand upward from the bottom portion and extend along an opening edge of the opening portion of the trunk room, a second standing wall portion which is provided to stand upward from an outward edge of the bottom portion and extend longitudinally, and a protrusion portion which is provided at a rear end portion of the bottom portion and the second standing wall portion to protrude upward and below which at least part of a rear combination lamp is stored, and said protrusion portion is spaced apart from said first standing wall portion such that a passage is formed between the protrusion portion and the first standing wall portion, the passage being configured to allow water to flow down from a portion of the bottom portion which is positioned forward of the protrusion portion toward a rear end portion of the bottom potion.

2. The rear structure of the vehicle of claim 1, wherein said trunk panel further comprises a guide wall portion which extends from a rear end of said first standing wall portion toward a rear edge of said bottom portion and forms a groove connecting to said passage between the guide wall portion and the protrusion portion.

3. The rear structure of the vehicle of claim 1, wherein said protrusion portion is configured such that an outer peripheral edge thereof extends rearward, gradually protruding inward in a vehicle width direction in a plan view.

4. The rear structure of the vehicle of claim 3, wherein a radar device is arranged right below said rear combination lamp and a rear end portion of said outer peripheral edge of the protrusion portion is located on an inward side, in the vehicle width direction, of said radar device in a plan view.

5. The rear structure of the vehicle of claim 3, wherein a hole for attaching said rear combination lamp is provided at an upper portion of said protrusion portion.

6. The rear structure of the vehicle of claim 2, wherein said protrusion portion is configured such that an outer peripheral edge thereof extends rearward, gradually protruding inward in a vehicle width direction in a plan view.

7. The rear structure of the vehicle of claim 6, wherein a radar device is arranged right below said rear combination lamp and a rear end portion of said outer peripheral edge of the protrusion portion is located on an inward side, in the vehicle width direction, of said radar device in a plan view.

8. The rear structure of the vehicle of claim 6, wherein a hole for attaching said rear combination lamp is provided at an upper portion of said protrusion portion.

* * * * *